(12) United States Patent
Antipa

(10) Patent No.: US 9,329,756 B2
(45) Date of Patent: May 3, 2016

(54) NAVIGATION IN A HIERARCHICAL NODE STRUCTURE

(71) Applicant: Adobe Systems Incorporated, San Jose, CA (US)

(72) Inventor: Damien Antipa, Saint-Louis (FR)

(73) Assignee: Adobe Systems Incorporated, San Jose, CA (US)

(*) Notice: Subject to any disclaimer, the term of this patent is extended or adjusted under 35 U.S.C. 154(b) by 256 days.

(21) Appl. No.: 14/021,077

(22) Filed: Sep. 9, 2013

(65) Prior Publication Data

US 2015/0074612 A1    Mar. 12, 2015

(51) Int. Cl.
*G06F 3/048* (2013.01)
*G06F 3/0482* (2013.01)

(52) U.S. Cl.
CPC .................................. *G06F 3/0482* (2013.01)

(58) Field of Classification Search
CPC . G06F 3/0481; G06F 3/0482; G06F 3/04883; G06F 3/04842; G06F 3/017; G06F 3/048; G06F 3/0883
See application file for complete search history.

(56) References Cited

U.S. PATENT DOCUMENTS

| | | | |
|---|---|---|---|
| 6,636,239 B1 * | 10/2003 | Arquie et al. ................. | 715/736 |
| 2009/0019348 A1 * | 1/2009 | King ............................. | 715/205 |
| 2013/0047123 A1 * | 2/2013 | May et al. .................... | 715/834 |
| 2014/0047361 A1 * | 2/2014 | Gaspar et al. ................ | 715/762 |

\* cited by examiner

*Primary Examiner* — Claudia Dragoescu
(74) *Attorney, Agent, or Firm* — Finch & Maloney PLLC

(57) ABSTRACT

Techniques are disclosed for navigation in a hierarchical node structure. A first graphical element representing a parent node in a hierarchical node structure is displayed via a graphical user interface (GUI). One or more second graphical elements, each representing a first child node of the parent node, are further displayed via the GUI on a first imaginary curve adjacent to or at least partially surrounding the parent node. In response to a user selection of one of the first child nodes, one or more third graphical elements each representing a second child node of the first child node are displayed via the GUI on a second imaginary curve adjacent to or at least partially surrounding the selected child node.

20 Claims, 10 Drawing Sheets

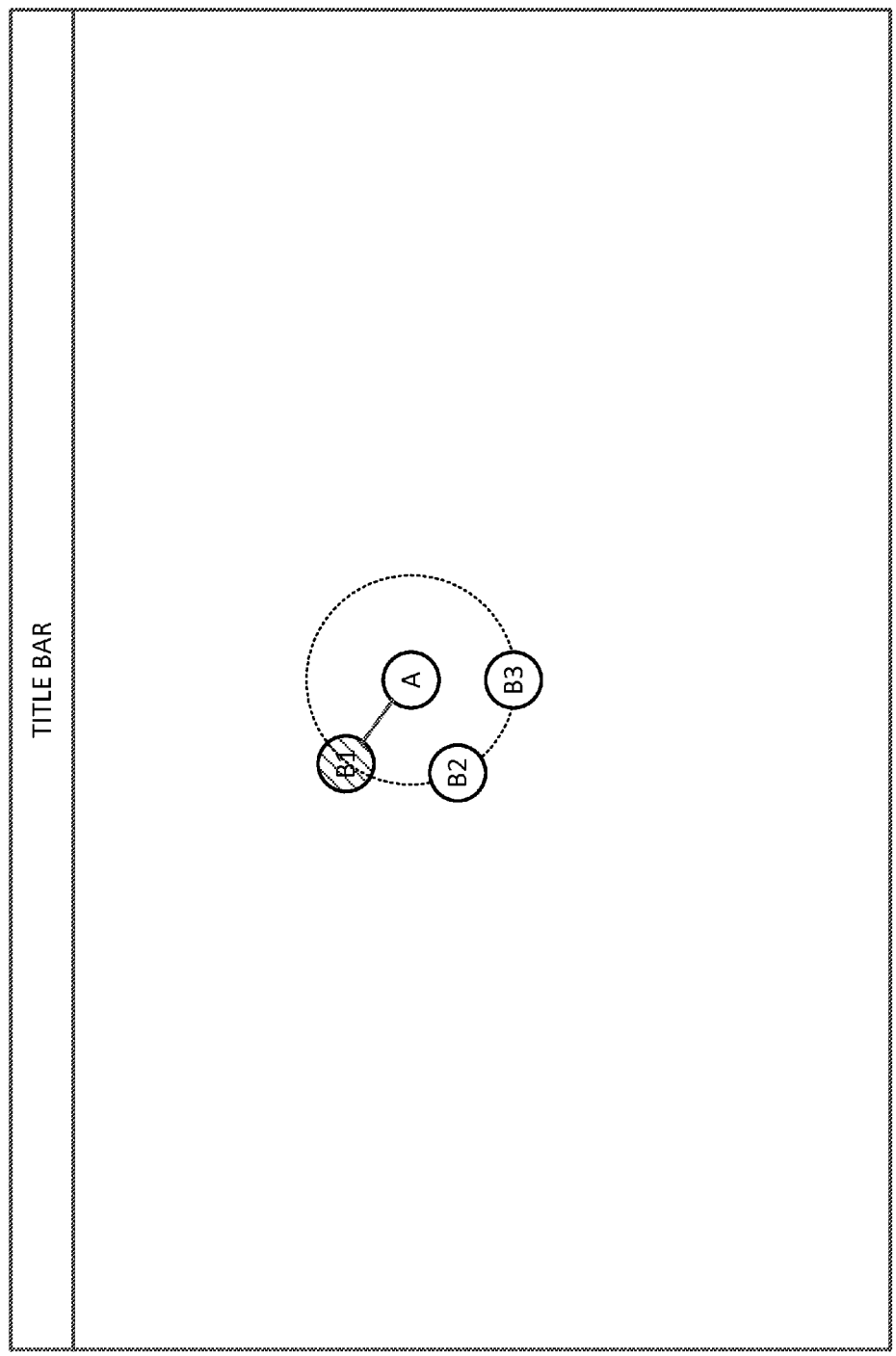

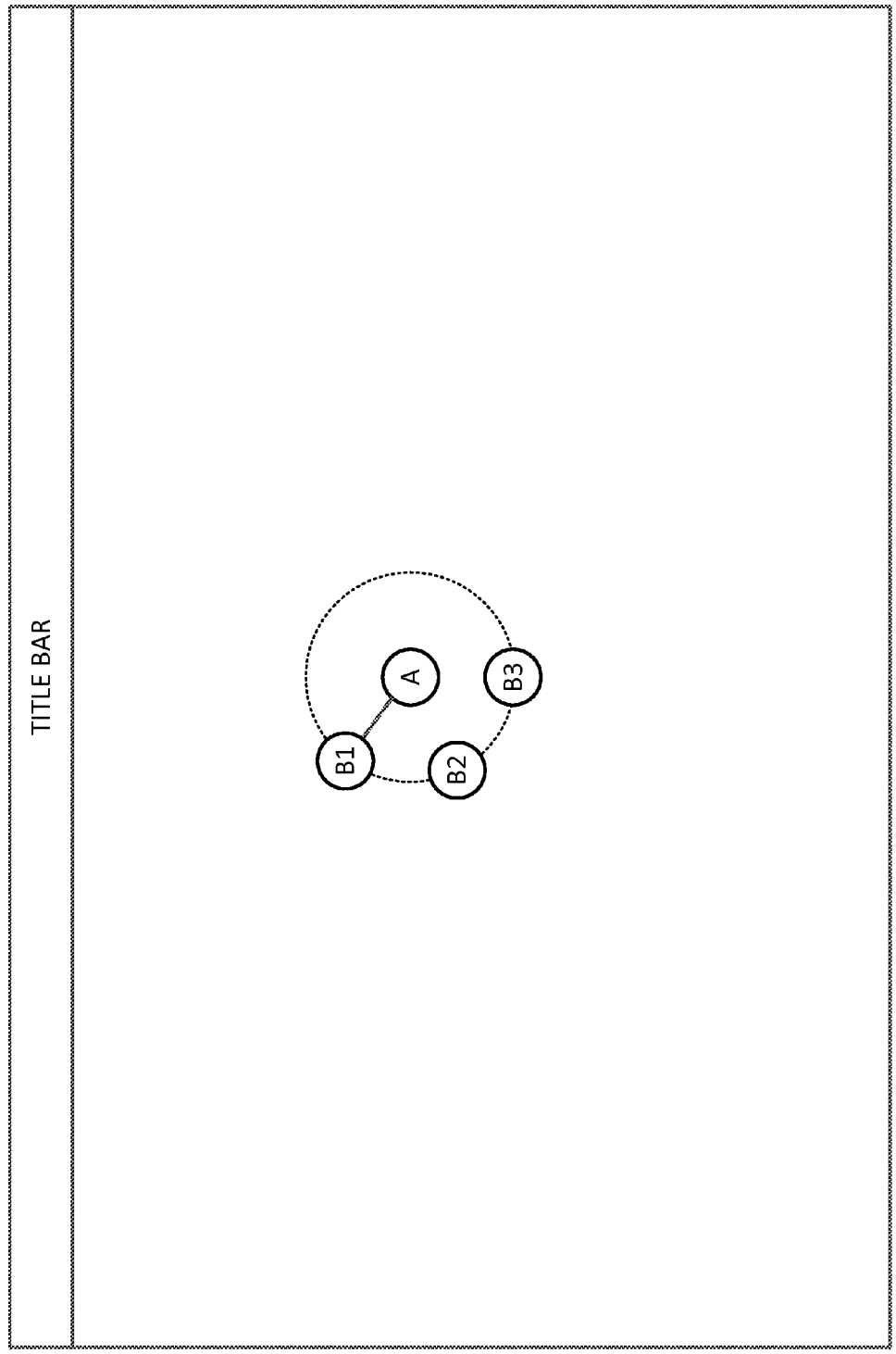

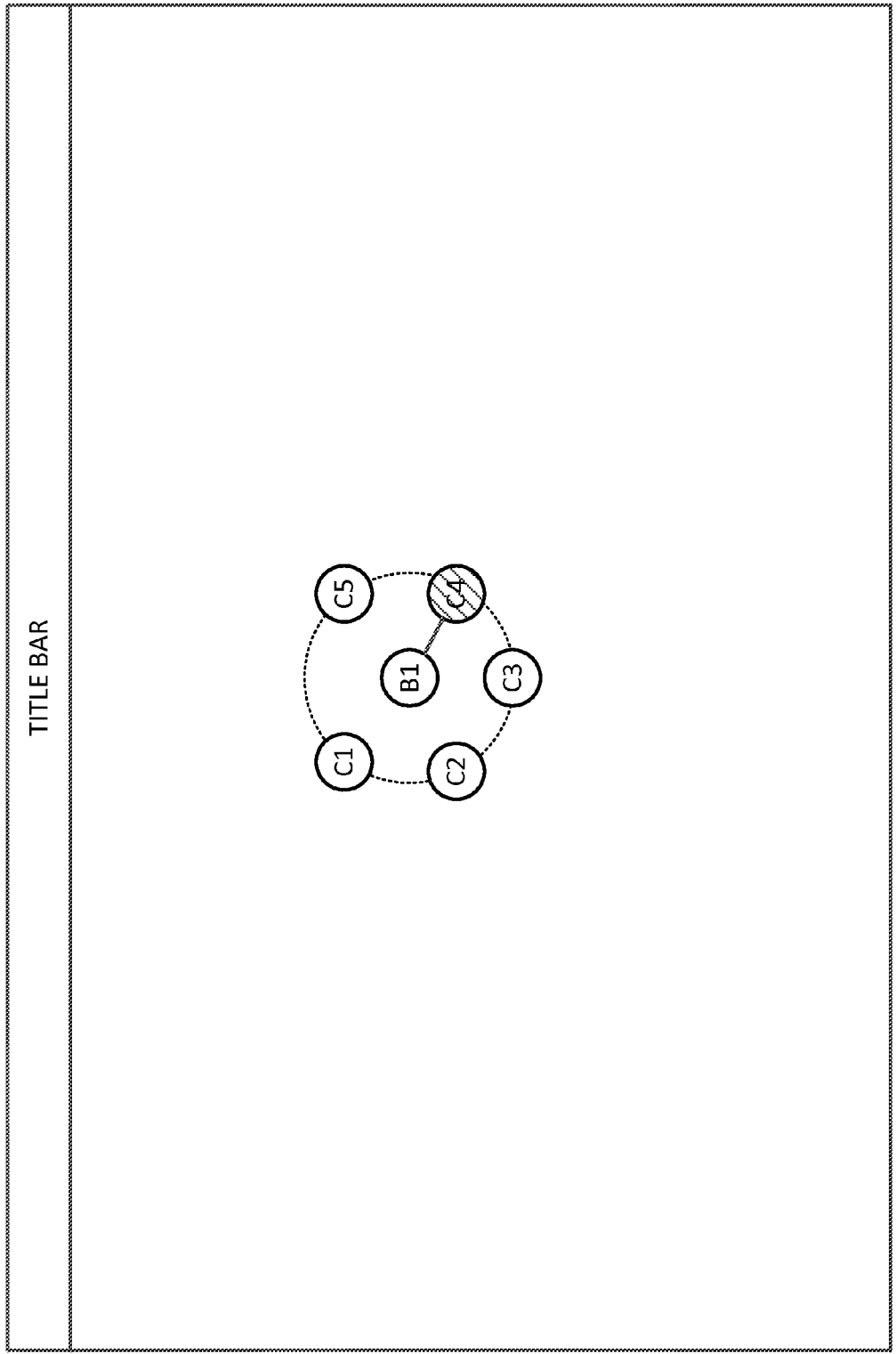

US 9,329,756 B2

NAVIGATION IN A HIERARCHICAL NODE STRUCTURE

FIELD OF THE DISCLOSURE

This disclosure relates generally to the field of data processing, and more particularly, to techniques for navigation in a hierarchical node structure, such as used in an object database.

BACKGROUND

A hierarchical structure can be graphically represented as a tree. Such a representation resembles branches and leaves extending outward from the root of the tree. The root, branches and leaves can visually depict the relationship of various elements or objects to one another, such as directories and subdirectories in a file system of a computer. Often such trees are used for navigating the hierarchical structure, for example, by selecting a representation of the desired object (e.g., an icon or text label) in a graphical user interface using a mouse or other input device.

BRIEF DESCRIPTION OF THE DRAWINGS

FIGS. 3a through 3g illustrate an example of a graphical user interface for navigating the hierarchical node structure of FIG. 2 in accordance with an embodiment of the present invention.

DETAILED DESCRIPTION

Figure 1:
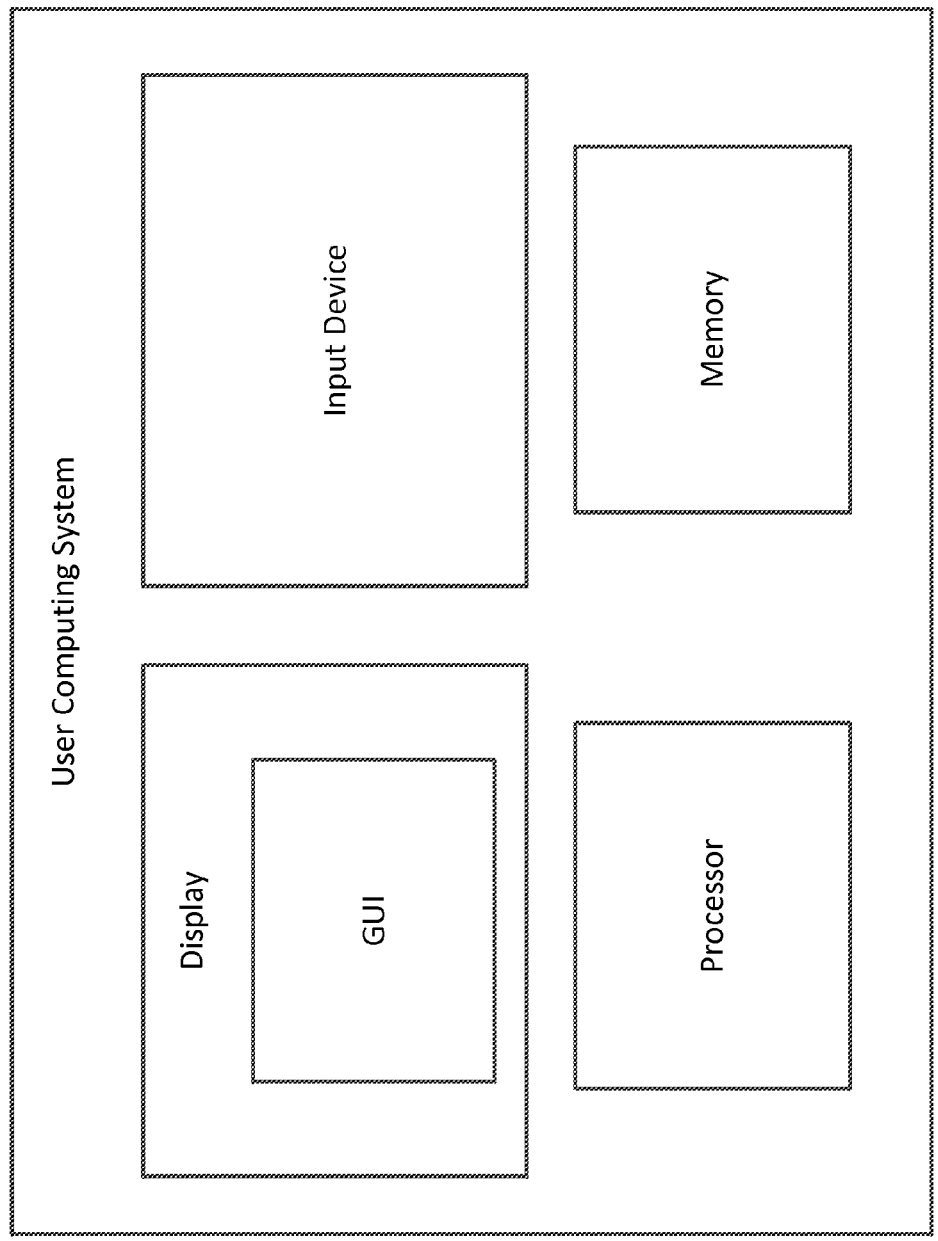
FIG. 1 illustrates an example user computing system configured in accordance with an embodiment of the present invention.

Techniques are disclosed for navigation in a hierarchical node structure. In one embodiment, a first graphical element representing a parent node in a hierarchical node structure is displayed via a graphical user interface (GUI). The first graphical element may include a circle or other icon located at any position, such as the center, of the GUI. One or more second graphical elements, each representing a child node of the parent node, are further displayed via the GUI on an imaginary curve (e.g., a circle) adjacent to or at least partially surrounding the first graphical element (i.e., the parent node). Each of the second graphical elements may include a circle or other icon. In response to a user selection of one of the second graphical elements (i.e., one of the child nodes), one or more third graphical elements each representing a child of the child node are displayed via the GUI and the previously displayed level of the hierarchical node structure is erased from the display. Each of the third graphical elements may include a circle or other icon located on an imaginary curve (e.g., a circle) adjacent to or at least partially surrounding the second graphical element (i.e., the selected child node). Similarly, in response to a user selection of the first graphical element (i.e., the parent node), a third graphical element representing a parent of the parent node is displayed via the GUI. The first graphical element can be located on an imaginary curve (e.g., a circle) adjacent to or at least partially surrounding the third graphical element. Thus, a user can navigate up and down a given hierarchical node structure and the GUI will display one level of the structure at a time, in accordance with an embodiment.

General Overview

A hierarchy is an arrangement of items placed above, below, and/or at the same level as one another. The items in the hierarchy can be mathematically modeled as interrelated nodes having a tree-like structure, where child nodes are connected to their respective parent nodes by branches, and a root node (i.e., a node having no parent) forms the vertex of the tree. For example, in an object database, such as a Content Repository for Java (JCR), data objects and relationships between the data objects may be stored in a hierarchical node structure. Each node may be graphically depicted in a GUI as an icon or text label located adjacent to other icons or labels of the respective parent and/or child nodes. A user may navigate across the hierarchical node structure by selecting the icon or label of the desired data object using a mouse or touch screen. However, for node structures having many levels, the GUI can become cluttered and crowded with text and icons, making the interface overwhelming or otherwise difficult to use when most or all of the levels are simultaneously displayed. This problem is exacerbated on certain computing devices, such as smartphones and tablet computers, which have relatively small screen sizes and a limited ability to display a large amount of information.

Thus, and in accordance with an embodiment of the present invention, techniques are provided herein for navigation in a hierarchical node structure in which a limited number of levels in a hierarchical node structure are displayed via a graphical user interface. As used herein, one level of a hierarchical node structure refers to one parent node and one or more child nodes of that parent node. A graphical element representing a parent or root node in the hierarchical node structure is placed in, for example, the middle of the GUI and visually highlighted. One or more additional graphical elements representing child nodes are placed around the parent or root node. The child nodes can be arranged, for example, in a circular formation around the parent or root node. To traverse down one level of the hierarchical structure, the user can select one of the child nodes using an input device such as a mouse or touch screen. In response to the selection, a visual transition occurs in which the selected node is centered in the GUI and the parent node is hidden or otherwise erased from the view. During the transition a line may be drawn between the selected node and the parent node, and/or some or all of the other nodes (e.g., the non-selected nodes) may also become hidden or otherwise erased from the view. In some cases, the appearance, disappearance and movement of the various graphical elements in the GUI can be animated in a smooth, gradual and continuous manner (i.e., without sudden or abrupt visual changes). For example, the selected node may move along the line toward the location of the parent node, and as the selected node moves along that line the parent node fades from view and the selected node becomes the central visually highlighted node. During the transition or after the transition is complete, one or more additional graphical elements representing child nodes of the selected node are displayed in a circular formation around the now-centered selected node. Further, the line between the selected node and the parent node, if present, may be erased or otherwise faded from view during or subsequent to the transition. To traverse up one level of the hierarchical structure, the user can select the center (i.e., parent) node. In response to this selection, another visual transition occurs, which can be substantially a reversal of the above sequence. Thus, between transitions two adjacent levels of the structure can be simultaneously displayed, which provides a simpler and easier-to-use navigation interface that is more suitable for all screen sizes, and particularly for small-screen devices. It will be apparent that any number of traversals, either up or down adjacent levels of the hierarchical structure, can be accomplished using the above-described techniques. The techniques described herein advantageously provide a GUI in which fewer than all levels of the hierarchical node structure are displayed at once (e.g., the GUI may be limited to displaying one or two adjacent levels), and further provides selectable graphical elements for traversing up and down the structure. In this manner, the user can remain focused on navigating across the structure because the display is limited to one or two adjacent levels of the hierarchy and further, since it is not necessary to display the same amount of information as in the full tree structures, a single node can be displayed in a larger size to be usable on smaller screen sizes and touch devices.

As used herein, the term "node," in addition to its plain and ordinary meaning, includes a resource such as a web page, a document, program code, a record or other data structure in a database, a device such as a computer or switch attached to another computer or telecommunications network, a computing resource, and/or a resource in a workflow. In general, a node can refer to any item, object or entity in a hierarchical structure.

System Architecture

FIG. 1 illustrates an example user computing system configured in accordance with an embodiment. A user computing system includes a processor for executing software, a memory for storing data, including the software and data that can be represented in a hierarchical node structure, a display for displaying a GUI such as described herein, and an input device, such as a keyboard, mouse, touch screen and the like. The user computing system may include additional components and still fall within the scope of the disclosed embodiments. The user computing system can be configured to execute any of a number of operating systems, such as Microsoft Windows®, Mac OS®, Google Android® and any one of the Linux®-based operating systems. The user computing system can be implemented with any suitable computing device, such as a laptop, desktop, tablet computer, smartphone, or other suitable computing device capable of receiving input from a user and providing a GUI via the display. Such a system may be suitable, for example, for navigation of a hierarchical node structure using techniques as variously described herein.

As will be appreciated in light of this disclosure, the various components of the system shown in FIG. 1, such as the graphical user interface, can be implemented in software, such as a set of instructions (e.g. C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Example Use Cases

Figure 2:
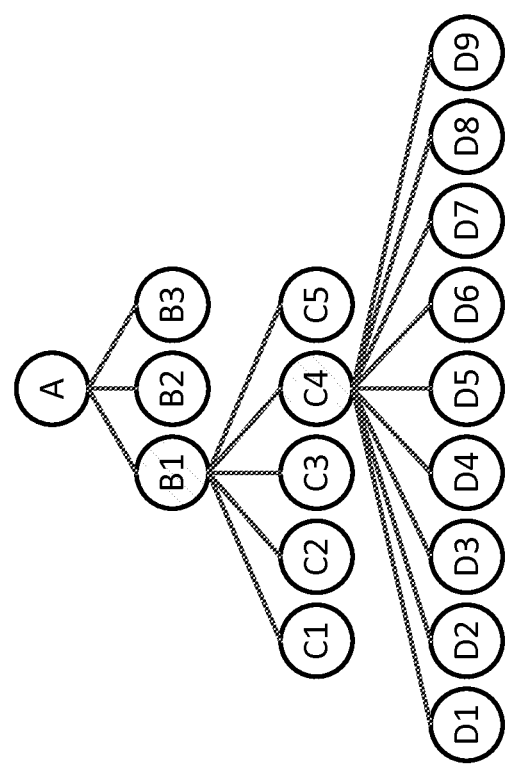
FIG. 2 illustrates an example hierarchical node structure in accordance with an embodiment of the present invention.

FIG. 2 illustrates an example hierarchical node structure in accordance with an embodiment. In this example, the root node A has three child, or subordinate, nodes B1, B2 and B3, node B1 has five child nodes C1-C5, and node C4 has nine child nodes D1-D9. Put in another perspective, node C4 is the parent, or superior, of nodes D1-D9, node B1 is the parent of nodes C1-C5, and node A is the parent of node B1. Other such structures having any number of nodes and levels will be apparent and are intended to be within the scope of various embodiments. Each node can represent any type of information, such as a data object, file name, parameter value, etc.

Figure 3A:
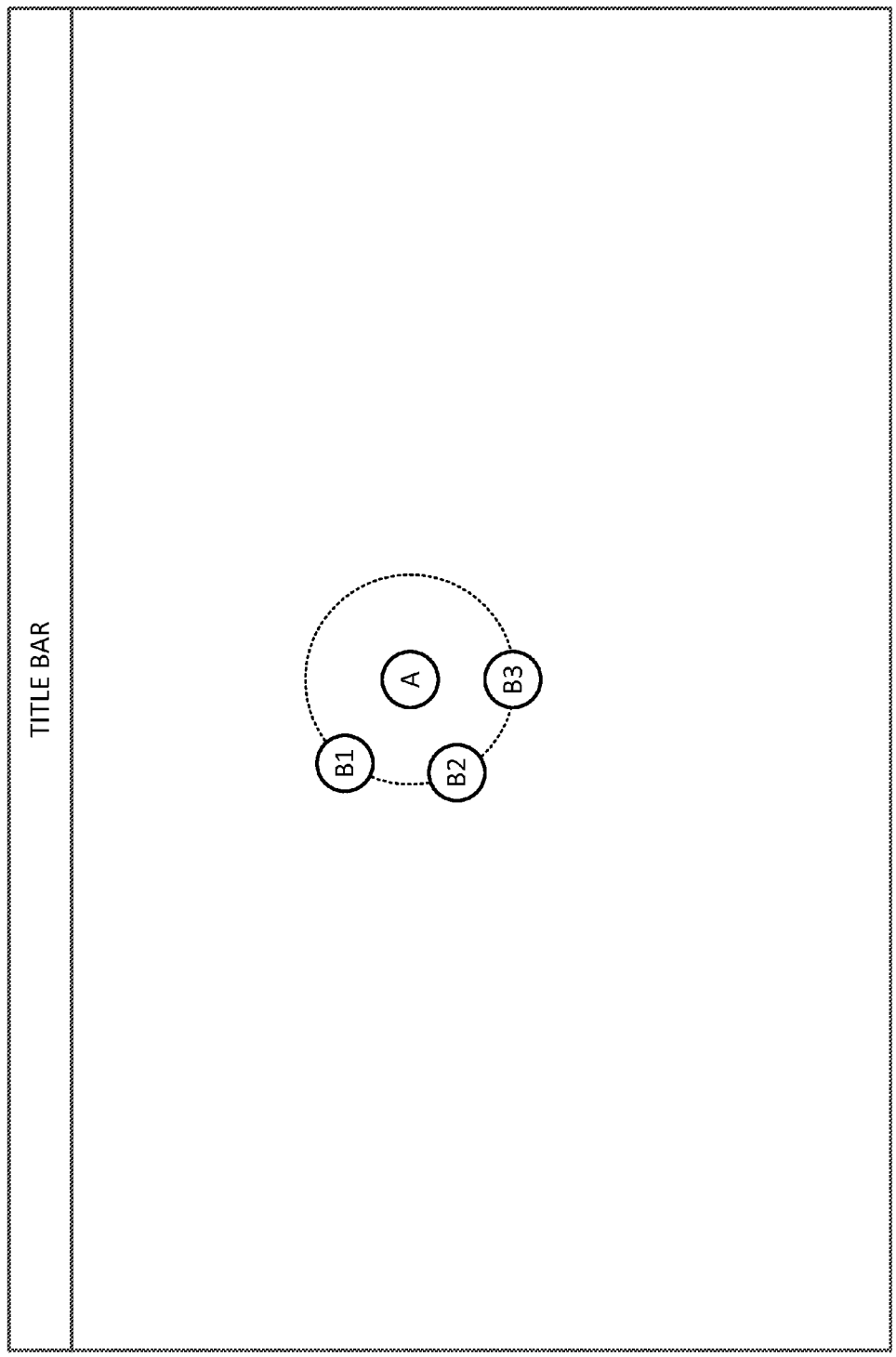

FIGS. 3a through 3g illustrate an example of a graphical user interface for navigating a hierarchical node structure, according to an embodiment. For explanatory purposes, the nodes depicted in FIGS. 3a-3g correspond to the example hierarchical node structure of FIG. 2. The GUI is generally depicted having a frame with a title bar and a display region; other arrangements and components of the GUI may be consistent with a given application and will be apparent. The GUI is configured to display various graphical and textual content and to permit a user to interact with the content using an input device, such as a mouse or touch screen. FIG. 3a shows a graphical element representing node A (e.g., a parent node) and three additional graphical elements representing nodes B1, B2 and B3 (e.g., child nodes of node A). The child nodes B1, B2 and B3 are located on an imaginary curve adjacent to parent node A. The imaginary curve is depicted as a dashed circle, which is shown for reference and is not necessarily visible to the user. It will be understood that in some embodiments the imaginary curve may take on other shapes, such as an ellipse, oval, square, triangle, rectangle, etc., of varying diameters and sizes, and that the imaginary curve may be an open curve or a closed curve that is adjacent to and/or surrounds the parent node, either in whole or in part. In this example, node A is located at or near the center region of the display region of the GUI; however, the graphical elements for any of the nodes may be located anywhere within the GUI.

Figure 3C:
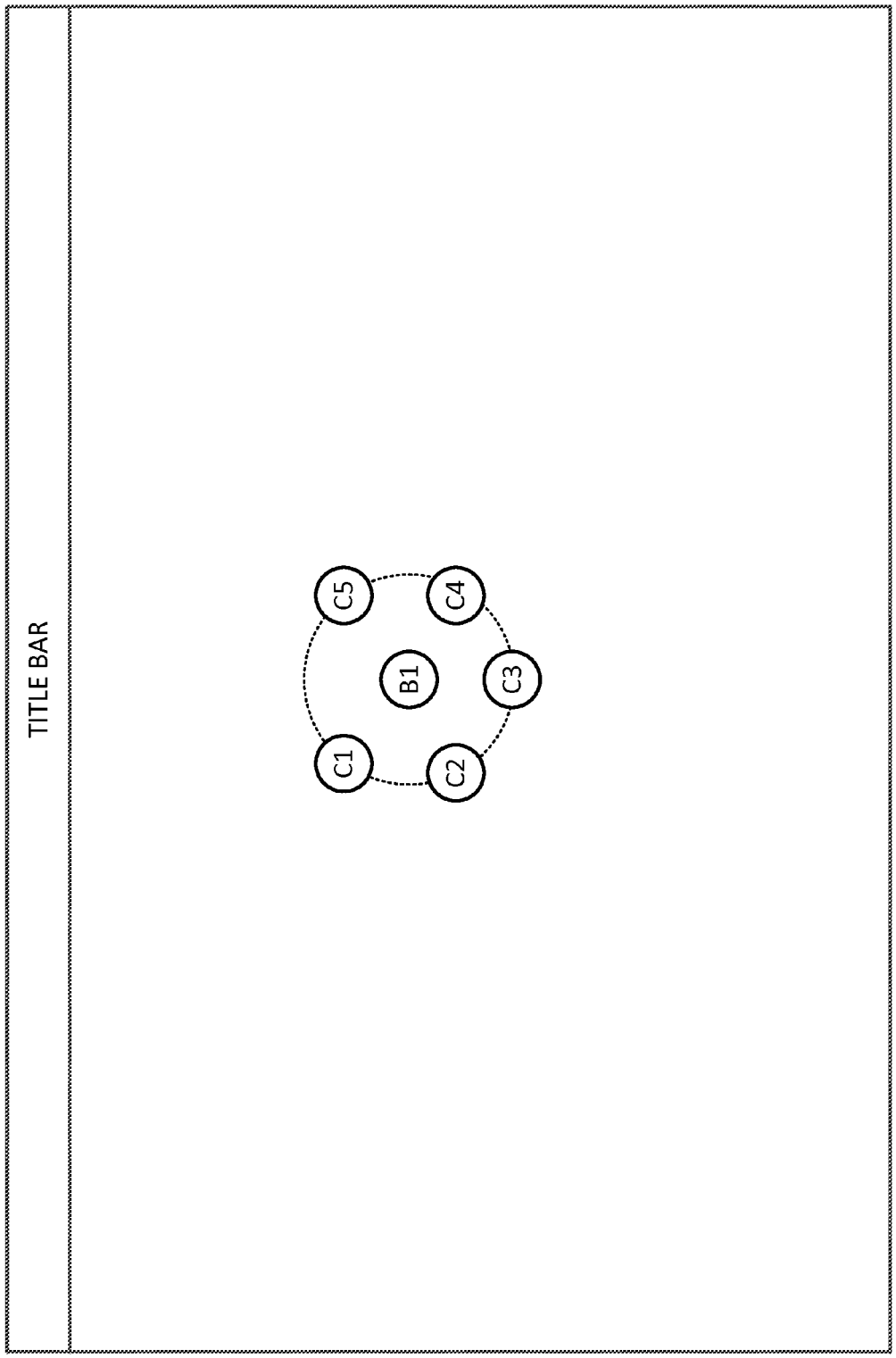

Each of the graphical elements (i.e., nodes A, B1, B2 and B3) are selectable by the user with a suitable input device. For example, if the user wishes to traverse down one level of the hierarchical node structure via node B1, the user may select node B1. In FIG. 3b, node B1 is highlighted to indicate that it has been selected, although such highlighting is not necessarily visible to the user. In response to the selection of node B1, a line is drawn between node B1 and node A to depict the parent-child relationship of the two nodes, and a graphical transition of the GUI begins. During the transition, node B1 becomes the centrally-located node, unselected nodes B2 and B3 are hidden, as is parent node A, and nodes C1-C5 (e.g., the child nodes of selected node B1) are displayed. FIG. 3c shows the selected graphical element (i.e., node B1) and the five additional graphical elements representing nodes C1-C5 subsequent to the transition. The child nodes C1-C5 are located on an imaginary curve adjacent to parent node B1, depicted as a dashed circle. As mentioned above, it will be understood that in some embodiments the imaginary curve may take on other shapes and that the imaginary curve is not necessarily a part of, or displayed by, the GUI, but is used herein for descriptive purposes. In some embodiments, the imaginary curve may be coincident with the imaginary curve of FIGS. 3a and 3b, although not necessarily so. In this example, node B1 is now located at or near the center region of the display region of the GUI (i.e., at the former position of node A), and node A has been hidden or erased from the GUI; however, the graphical elements may be located anywhere within the GUI. During the transition, the appearance, disappearance and movement of the various graphical elements in, for example, FIGS. 3b and 3c can be animated so as to provide a smooth, gradual and continuous transition between the depicted configurations. For example, the graphical element representing node B1 can slide from the location shown in FIG. 3b to the center region shown in FIG. 3c, the graphical element representing node A can fade out of view, and the graphical elements representing nodes C1-C5 can fade into view in or near the depicted locations. Other types of animations may be used, including, for example, changing the shape, color or appearance of the graphical elements prior to, during or subsequent to the transition. In another example, the color of any of the graphical elements can be set or change prior to, during, or subsequent to the transition. For instance, the graphical element representing the parent node may be orange and the graphical elements representing the child nodes may be blue. When one of the child nodes is selected, the corresponding graphical element may change from blue to orange, and when the parent node is selected, the corresponding graphical element may change from orange to blue.

Figure 3D:
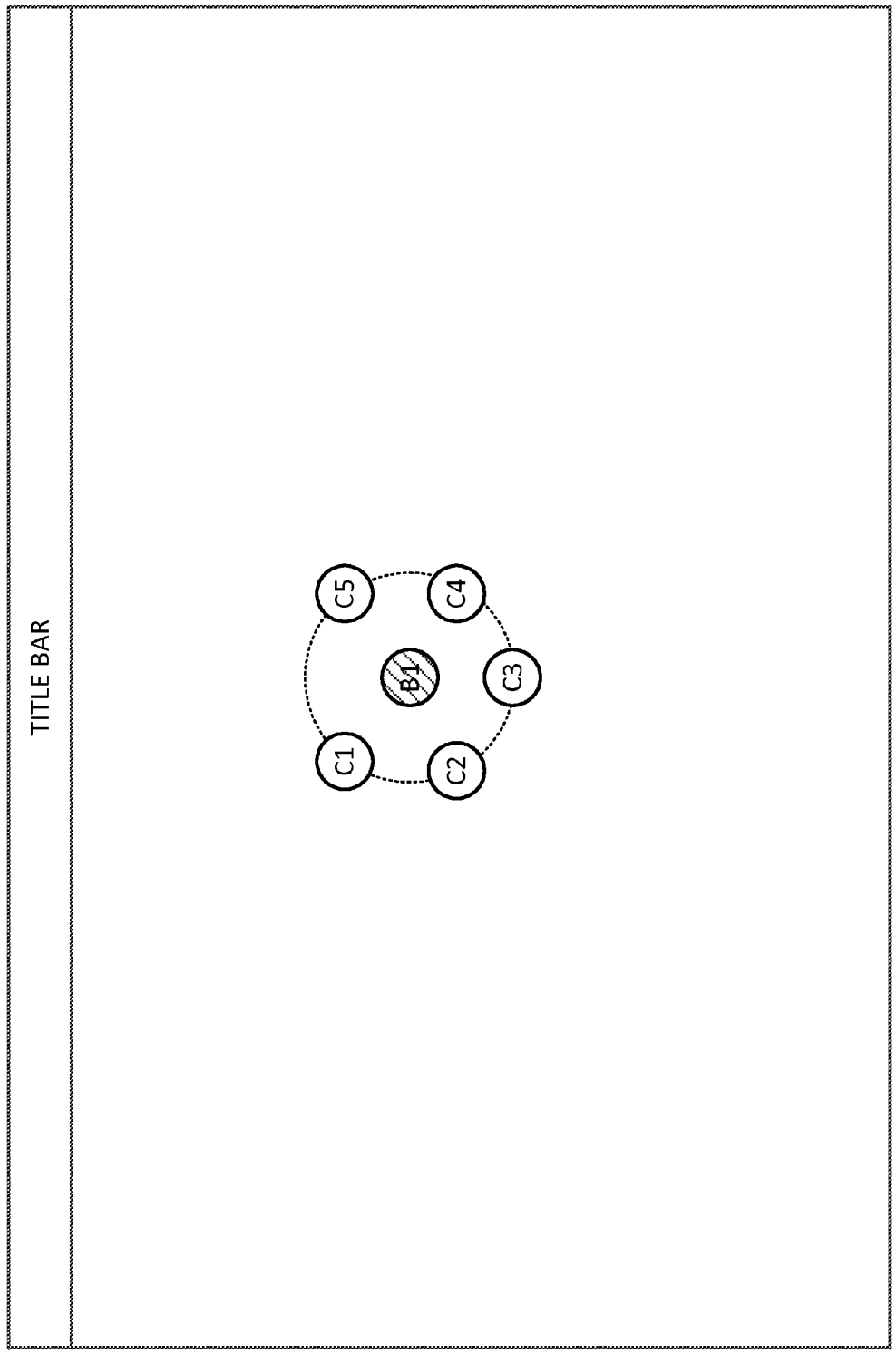

Continuing with this example GUI, in FIG. 3d, node B1 is highlighted to indicate that it has been selected; that is, the user wishes to traverse up one level of the hierarchical node structure. In response to the selection of node B1, another graphical transition of the GUI begins. During the transition, node A (i.e., the parent node of selected node B1) is displayed and becomes the centrally-located node, unselected nodes C1-C5 are hidden, and nodes B1, B2 and B3 (i.e., the child nodes of node A) are displayed. FIG. 3e shows the selected graphical element (i.e., node B1) and the graphical element representing node A during the transition. During the transition a line is drawn between node B1 and node A to depict the parent-child relationship of the two nodes. As in FIG. 3a, child nodes B1, B2 and B3 are located on an imaginary curve adjacent to parent node A, again depicted as a dashed circle. In this example, node A is again located at or near the center region of the display region of the GUI (i.e., at the former position of node B1), and nodes C1-C5 have been hidden or erased from the GUI; however, the graphical elements may be located anywhere within the GUI. As described above, during the transition, the appearance, disappearance and movement of the various graphical elements can be animated so as to provide a smooth, gradual and continuous transition between the configurations depicted in, for example, FIGS. 3d and 3e.

Figure 3G:
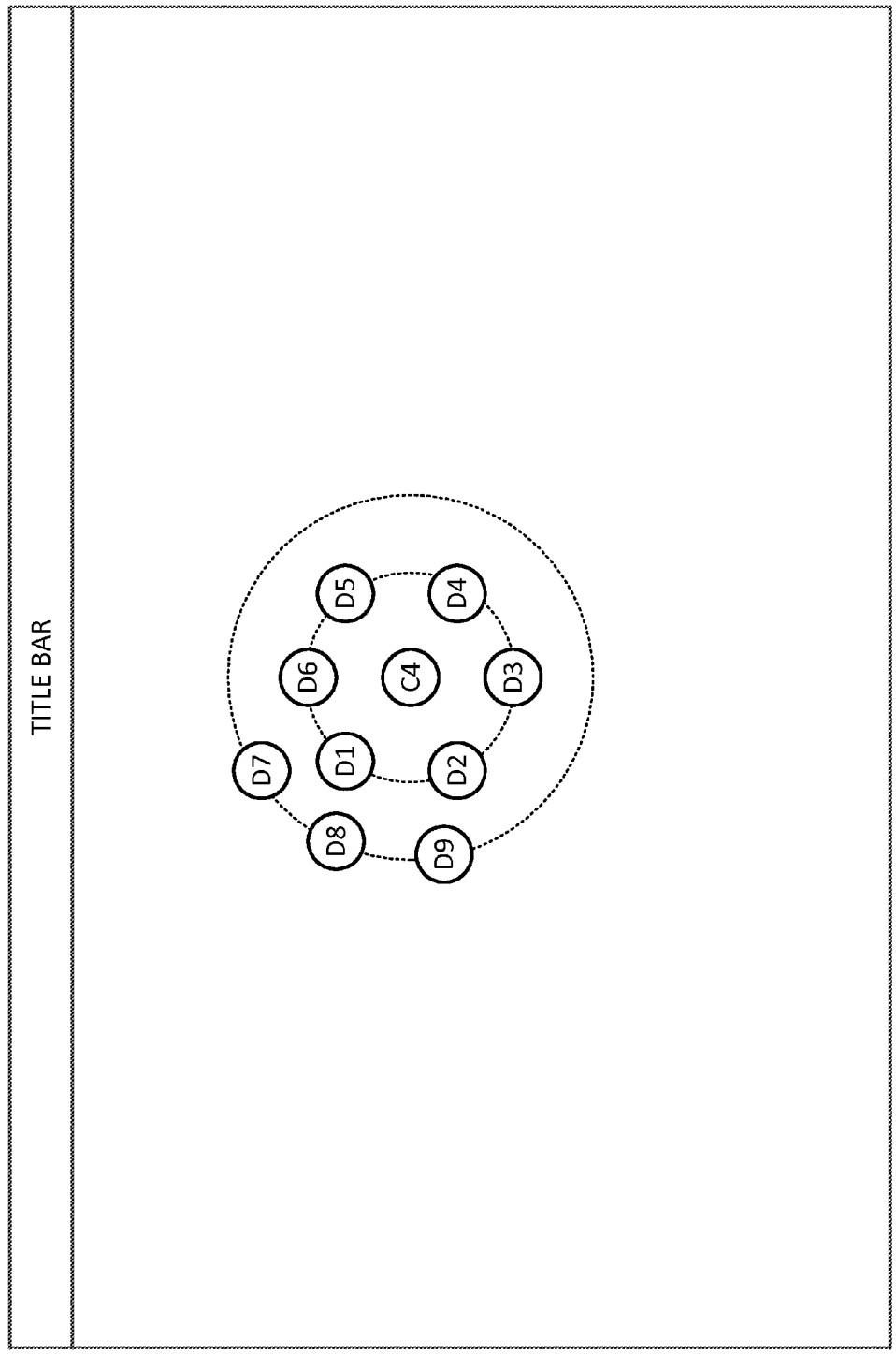

In contrast to the example of FIG. 3d, in which Node B1 is selected, in FIG. 3f, node C4 is highlighted to indicate that is has been selected; that is, the user wishes to traverse down one level of the hierarchical node structure. In response to the selection of node C4, another graphical transition of the GUI begins. During the transition, node C4 becomes the centrally-located node, unselected nodes C1, C2, C3 and C5 are hidden, as is parent node B1, and nodes D1-D9 (i.e., the child nodes of selected node C4) are displayed. During the transition a line is drawn between node C4 and node B1 to depict the parent-child relationship of the two nodes. FIG. 3g shows the selected graphical element (i.e., node C4) and the nine graphical elements representing nodes D1-D9 subsequent to the transition. Some of the graphical elements (i.e., child nodes D1-D6) are located on a first imaginary curve adjacent to the parent node C4, again depicted as a dashed circle. Furthermore, the remaining graphical elements (i.e., child nodes D7-D9) are located on a second imaginary curve to accommodate the nodes which do not fit onto the first imaginary curve. The distance between each graphical element, and the number of graphical elements on each imaginary curve, can be determined automatically according to pre-defined or user-defined parameters, such as the radius of each imaginary curve and the minimum spacing between the graphical elements. In this example, node C4 is located at or near the center region of the display region of the GUI (i.e., at the former position of node B1), and nodes C1, C2, C3 and C5 have been hidden or erased from the GUI; however, the graphical elements may be located anywhere within the GUI. As described above, during the transition, the appearance, disappearance and movement of the various graphical elements can be animated so as to provide a smooth, gradual and continuous transition between the configurations depicted in, for example, FIGS. 3f and 3g.

Example Methodology for Navigation in a Hierarchical Node Structure

Figure 4:
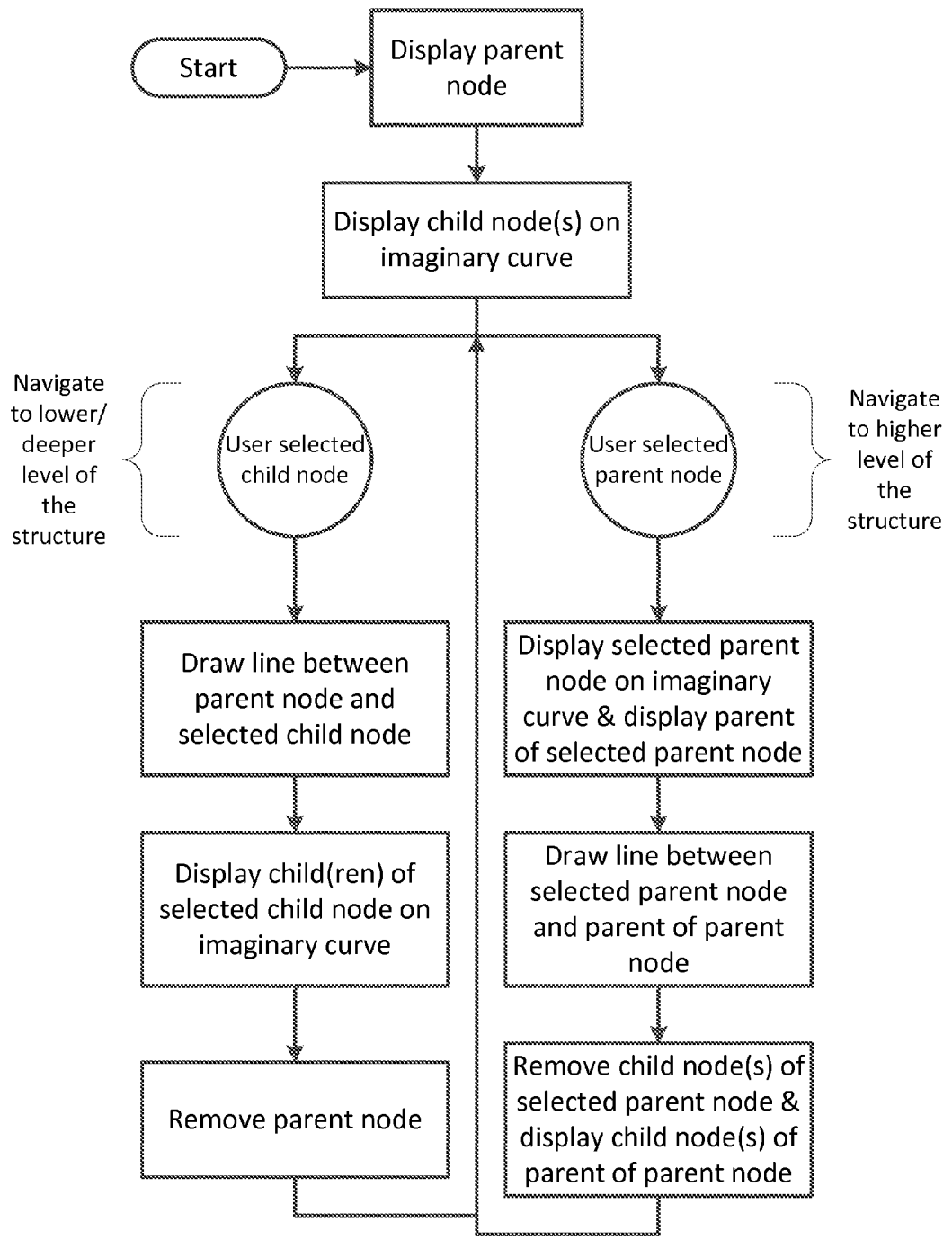
FIG. 4 illustrates a methodology for navigation in a hierarchical node structure in accordance with an embodiment of the present invention.

FIG. 4 illustrates a methodology for navigation in a hierarchical node structure, according to an embodiment. This method can be carried out, for example, by the user computing system of FIG. 1. JavaScript or other suitable code can be used to implement the method. In one such embodiment, the methodology can be used in conjunction with a Content Repository for Java (JCR). Such a JCR may include an object database arranged in a hierarchical node structure, such as depicted in the example of FIG. 2.

The method begins by displaying a graphical element representing a parent node of a hierarchical node structure. The parent node can be displayed in a graphical user interface, such as the example GUI of FIGS. 1 and 3a-3g. For instance, a circle representing node B1 (the parent node) may be displayed in the GUI such as depicted in FIG. 3c. The method continues by displaying one or more graphical elements each representing a child node of the parent node. These graphical element(s) can be located on an imaginary curve (e.g., a circle) adjacent to the parent node, such as depicted in FIG. 3c (e.g., child nodes C1-C5 are arranged in a circle surrounding parent node B1).

At this point the method can continue in one of two possible paths, depending on the occurrence of an external event. One event occurs when a user selects one of the child nodes in the GUI (e.g., nodes C1-C5, such as depicted in FIG. 3f), and another event occurs when the user selects the parent node (e.g., node B1, such as depicted in FIG. 3d). If the user selects one of the child nodes, the method continues by drawing a line between the parent node and the selected child node, such as depicted in FIG. 3f. The method continues by displaying one or more graphical elements each representing a child of the selected child node (e.g., nodes D1-D9 are each children of selected child node C4) on an imaginary curve (e.g., a circle), and erasing the parent node (e.g., node B1), to obtain a result such as depicted in FIG. 3g. As shown in the example of FIG. 3g, in some cases, the method may display at least some of the graphical elements at locations on the same imaginary curve or on several imaginary curves (e.g., multiple concentric circles) as needed to accommodate all of the child nodes within the GUI, depending on the shapes and sizes of the curve(s) and graphical elements, which may be pre-defined or user-defined. In some cases, the spacing and arrangement of the graphical elements can be automatically determined, for example, by equally spacing all of the graphical elements apart from one another by at least a minimum amount to prevent crowding or overlapping. If there is insufficient space to display all nodes, then some nodes may not be displayed. It is noted that, in some embodiments, the parent node is not necessarily hidden, depending on how many levels of the hierarchical node structure are to be displayed. For example, in some instances the parent node (e.g., node B1), the selected child node (e.g., node C4), and each of the child of child nodes (e.g., D1-D9) may be displayed simultaneously. As shown in FIG. 4, the method can repeat indefinitely in response to the occurrence of the external events described herein. It will be understood that each time the method repeats, the relationships in the hierarchical node structure are consistent with the context of the process depicted in FIG. 4. In the example of FIG. 2, for instance, node B1 is always a child of node A, and node C4 is always a child of node B1 (i.e., a child of a child). Likewise, node B1 is always a parent of node C4, and node A is always a parent of a node B1 (i.e., a parent of a parent), and so forth, as will be apparent.

If, on the other hand, the user selects the parent node in the GUI (e.g., node B1, such as depicted in FIG. 3*d*), the method continues by displaying a graphical element representing a parent of the selected parent node (e.g., node A is the parent of selected node B1) and drawing a line between the parent of the parent node and the selected parent node, such as depicted in FIG. 3*e*. The parent of the selected parent node (e.g., node A) can be centered in the GUI, and the selected parent node (e.g., node B1) can be displayed on an imaginary curve (e.g., a circle) adjacent to the now-centered parent of the parent node. The method continues by erasing each of the child nodes (e.g., nodes C1-C4), and displaying graphical representations of any other nodes that are children of the now-centered parent of the parent node (i.e., siblings of the selected parent node B1) to obtain a result such as depicted in FIG. 3*a*. In some cases, the imaginary curves may coincide with one another (i.e., they are, at least in part, the same curves). As described above, the method can repeat indefinitely in response to the occurrence of the external events described above.

Numerous embodiments will be apparent in light of the present disclosure, and features described herein can be combined in any number of configurations. One example embodiment provides a computer-implemented method. The method includes displaying a first graphical element via a graphical user interface and displaying a second graphical element via the graphical user interface, in which the first graphical element represents a parent node of a hierarchical node structure having multiple levels, and the second graphical element is located on a first imaginary curve adjacent to the first graphical element and represents a child node of the parent node. In such cases, the first and second graphical elements represent one level of the hierarchical node structure, and the other levels of the hierarchical node structure are not displayed. In some cases, the method includes, in response to a selection of the second graphical element, displaying a third graphical element via the graphical user interface. In such cases, the third graphical element is located on a second imaginary curve adjacent to the second graphical element and represents a child node of the second graphical element. In some such cases, the method further includes drawing a line between the first graphical element and the second graphical element in response to the selection of the second graphical element. In some other such cases, the method further includes erasing the first graphical element in response to the selection of the second graphical element. In some other such cases, the method further includes moving the second graphical element to a center region of the graphical user interface in response to the selection of the second graphical element. In some cases, the method includes, in response to a selection of the first graphical element, displaying a third graphical element via the graphical user interface and relocating the first graphical element to a second imaginary curve adjacent to the third graphical element. In such cases, the third graphical element represents a parent node of the first graphical element. In some such cases, the method further includes drawing a line between the first graphical element and the third graphical element in response to the selection of the first graphical element. In some other such cases, the method further includes erasing the second graphical element in response to the selection of the first graphical element. In some other such cases, the method further includes displaying the third graphical element at a center region of the graphical user interface in response to the selection of the first graphical element. In some cases, the first imaginary curve includes a circle surrounding the first graphical element. In some such cases, the method further includes displaying a plurality of graphical elements each located on the circle at least a minimum distance from one another, where each of the graphical elements represents one of a plurality of child nodes of the parent node. In some other such cases, the circle is a first circle, a second circle surrounds the first circle, each of a plurality of graphical elements represents one of a plurality of child nodes of the parent node, and the method further includes displaying a first portion of the graphical elements on the first circle at least a minimum distance from one another and displaying a second portion of the graphical elements on the second circle at least the minimum distance from one another. In some cases, the hierarchical node structure represents a plurality of data objects stored in a database. Variations will be apparent.

Another example embodiment provides a digital media processing system. The system includes a storage, a display configured to provide a graphical user interface, and a processor operatively coupled to the storage and configured to execute instructions stored in the storage for carrying out a process. The process includes displaying a first graphical element via a graphical user interface and displaying a second graphical element via the graphical user interface, in which the first graphical element represents a parent node of a hierarchical node structure having multiple levels, and the second graphical element is located on a first imaginary curve adjacent to the first graphical element and represents a child node of the parent node. In such cases, the first and second graphical elements represent one level of the hierarchical node structure, and the other levels of the hierarchical node structure are not displayed. In some cases, the process includes, in response to a selection of the second graphical element, displaying a third graphical element via the graphical user interface. In such cases, the third graphical element is located on a second imaginary curve adjacent to the second graphical element and represents a child node of the second graphical element. In some such cases, the process further includes drawing a line between the first graphical element and the second graphical element in response to the selection of the second graphical element. In some other such cases, the process further includes erasing the first graphical element in response to the selection of the second graphical element. In some other such cases, the process further includes moving the second graphical element to a center region of the graphical user interface in response to the selection of the second graphical element. In some cases, the process includes, in response to a selection of the first graphical element, displaying a third graphical element via the graphical user interface and relocating the first graphical element to a second imaginary curve adjacent to the third graphical element. In such cases, the third graphical element represents a parent node of the first graphical element. In some such cases, the process further includes drawing a line between the first graphical element and the third graphical element in response to the selection of the first graphical element. In some other such cases, the process further includes erasing the second graphical element in response to the selection of the first graphical element. In some other such cases, the process further includes displaying the third graphical element at a center region of the graphical user interface in response to the selection of the first graphical element. In some cases, the first imaginary curve includes a circle surrounding the first graphical element. In some such cases, the process further includes displaying a plurality of graphical elements each located on the circle at least a minimum distance from one another, where each of the graphical elements represents one of a plurality of child nodes of the parent node. In some other such cases, the circle is a first circle, a second circle surrounds the first circle, each of a plurality of graphical elements represents one of a plurality of child nodes of the parent node, and the process further includes displaying a first portion of the graphical elements on the first circle at least a minimum distance from one another and displaying a second portion of the graphical elements on the second circle at least the minimum distance from one another. In some cases, the hierarchical node structure represents a plurality of data objects stored in a database. Variations will be apparent. For example, in some cases, some or all of the functions variously described in this paragraph can be performed in any order and at any time by one or more different user computing systems. Another example embodiment provides a non-transient computer-readable medium or computer program product having instructions encoded thereon that when executed by one or more processors cause the processor(s) to perform one or more of the functions variously described in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented data processing method comprising:
   displaying a first graphical element via a graphical user interface, the first graphical element representing a parent node of a hierarchical node structure having multiple levels;
   displaying a second graphical element via the graphical user interface, the second graphical element being located on a first imaginary curve adjacent to the first graphical element, the second graphical element representing a child node of the parent node;
   animating a drawing of a line between the first graphical element and the second graphical element in response to a selection of the second graphical element; and
   animating an erasing of the line between the first graphical element and the second graphical element subsequent to the drawing of the line,
   wherein the first and second graphical elements represent one level of the hierarchical node structure and the other levels of the hierarchical node structure are not displayed;
   in response to a selection of the first graphical element, displaying a third graphical element at a center region of the graphical user interface, the third graphical element representing a parent node of the first graphical element; relocating the first graphical element to a second imaginary curve adjacent to the third graphical element; animating a drawing of a line between the first graphical element and the third graphical element; and animating an erasing of the line between the first graphical element and the third graphical element subsequent to the drawing of the line; wherein the first and third graphical elements represent one level of the hierarchical node structure and the other levels of the hierarchical node structure are not displayed; and
   in response to the selection of the second graphical element, relocating the second graphical element to a center region of the graphical user interface; displaying a fourth graphical element via the graphical user interface, the fourth graphical element representing a child node of the second graphical element, the fourth graphical element being located on a third imaginary curve adjacent to the second graphical element; wherein the second and fourth graphical elements represent one level of the hierarchical node structure and the other levels of the hierarchical node structure are not displayed.

2. The method of claim 1, further comprising, in response to the selection of the second graphical element, displaying a third graphical element via the graphical user interface, the third graphical element being located on a second imaginary curve adjacent to the second graphical element, the third graphical element representing a child node of the second graphical element.

3. The method of claim 1, wherein the animating of the erasing of the line between the first graphical element and the second graphical element further comprises hiding the first graphical element and displaying a third graphical element via the graphical user interface, the third graphical element being located on a second imaginary curve adjacent to the second graphical element, the third graphical element representing a child node of the second graphical element.

4. The method of claim 2, further comprising erasing the first graphical element in response to the selection of the second graphical element.

5. The method of claim 2, further comprising moving the second graphical element to a center region of the graphical user interface in response to the selection of the second graphical element.

6. The method of claim 1, further comprising, in response to a selection of the first graphical element, displaying a third graphical element via the graphical user interface and relocating the first graphical element to a second imaginary curve adjacent to the third graphical element, the third graphical element representing a parent node of the first graphical element.

7. The method of claim 6, further comprising drawing a line between the first graphical element and the third graphical element in response to the selection of the first graphical element.

8. The method of claim 6, further comprising erasing the second graphical element in response to the selection of the first graphical element.

9. The method of claim 6, further comprising displaying the third graphical element at a center region of the graphical user interface in response to the selection of the first graphical element.

10. The method of claim 1, wherein the first imaginary curve includes a circle surrounding the first graphical element.

11. The method of claim 10, further comprising displaying a plurality of graphical elements each located on the circle at least a minimum distance from one another, wherein each of the plurality of graphical elements represents one of a plurality of child nodes of the parent node.

12. The method of claim 10, wherein:
   the circle is a first circle;
   a second circle surrounds the first circle;
   each of a plurality of graphical elements represents one of a plurality of child nodes of the parent node; and the method further comprises displaying a first portion of the plurality of graphical elements on the first circle at least a minimum distance from one another and displaying a second portion of the plurality of graphical elements on the second circle at least the minimum distance from one another.

13. The method of claim 1, wherein the parent node and the child node are each nodes in a Content Repository for Java (JCR).

14. A digital media processing system, comprising:
a storage;
a display configured to provide a graphical user interface; and
a processor operatively coupled to the storage and configured to execute instructions stored in the storage for carrying out a process comprising:
displaying a first graphical element via the graphical user interface, the first graphical element representing a parent node of a hierarchical node structure having multiple levels;
displaying a second graphical element via the graphical user interface, the second graphical element being located on a first imaginary curve adjacent to the first graphical element, the second graphical element representing a child node of the parent node;
animating a drawing of a line between the first graphical element and the second graphical element in response to a selection of the second graphical element; and
animating an erasing of the line between the first graphical element and the second graphical element subsequent to the drawing of the line,
wherein the first and second graphical elements represent one level of the hierarchical node structure and the other levels of the hierarchical node structure are not displayed;
in response to a selection of the first graphical element, displaying a third graphical element at a center region of the graphical user interface, the third graphical element representing a parent node of the first graphical element; relocating the first graphical element to a second imaginary curve adjacent to the third graphical element; animating a drawing of a line between the first graphical element and the third graphical element; and animating an erasing of the line between the first graphical element and the third graphical element subsequent to the drawing of the line; wherein the first and third graphical elements represent one level of the hierarchical node structure and the other levels of the hierarchical node structure are not displayed; and
in response to the selection of the second graphical element, relocating the second graphical element to a center region of the graphical user interface; displaying a fourth graphical element via the graphical user interface, the fourth graphical element representing a child node of the second graphical element, the fourth graphical element being located on a third imaginary curve adjacent to the second graphical element; wherein the second and fourth graphical elements represent one level of the hierarchical node structure and the other levels of the hierarchical node structure are not displayed.

15. The system of claim 14, wherein the process further comprises, in response to the selection of the second graphical element, displaying a third graphical element, wherein the third graphical element is located on a second imaginary curve adjacent to the second graphical element, and wherein the third graphical element represents a child node of the second graphical element.

16. The system of claim 14, wherein the process further comprises, in response to a selection of the first graphical element, displaying a third graphical element and relocating the first graphical element to a second imaginary curve adjacent to the third graphical element, and wherein the third graphical element represents a parent node of the first graphical element.

17. The system of claim 14, wherein the first imaginary curve includes a circle surrounding the first graphical element.

18. The system of claim 17, wherein the process further comprises displaying a plurality of graphical elements each located on the circle at least a minimum distance from one another, and wherein each of the plurality of graphical elements represents one of a plurality of child nodes of the parent node.

19. The system of claim 17, wherein:
the circle is a first circle;
a second circle surrounds the first circle;
each of a plurality of graphical elements represents one of a plurality of child nodes of the parent node; and
the process further comprises displaying a first portion of the plurality of graphical elements on the first circle at least a minimum distance from one another and displaying a second portion of the plurality of graphical elements on the second circle at least the minimum distance from one another.

20. A non-transitory computer program product encoded with instructions that when executed by one or more processors cause a process to be carried out, the process comprising:
displaying a first graphical element via the graphical user interface, the first graphical element representing a parent node of a hierarchical node structure having multiple levels;
displaying a second graphical element via the graphical user interface, the second graphical element being located on a first imaginary curve adjacent to the first graphical element, the second graphical element representing a child node of the parent node;
animating a drawing of a line between the first graphical element and the second graphical element in response to a selection of the second graphical element; and
animating an erasing of the line between the first graphical element and the second graphical element subsequent to the drawing of the line,
wherein the first and second graphical elements represent one level of the hierarchical node structure and the other levels of the hierarchical node structure are not displayed;
in response to a selection of the first graphical element, displaying a third graphical element at a center region of the graphical user interface, the third graphical element representing a parent node of the first graphical element; relocating the first graphical element to a second imaginary curve adjacent to the third graphical element; animating a drawing of a line between the first graphical element and the third graphical element; and animating an erasing of the line between the first graphical element and the third graphical element subsequent to the drawing of the line; wherein the first and third graphical elements represent one level of the hierarchical node structure and the other levels of the hierarchical node structure are not displayed; and
in response to the selection of the second graphical element, relocating the second graphical element to a center region of the graphical user interface; displaying a fourth graphical element via the graphical user interface, the fourth graphical element representing a child node of the second graphical element, the fourth graphical element being located on a third imaginary curve adjacent to the second graphical element; wherein the second and fourth graphical elements represent one level of the hierarchical node structure and the other levels of the hierarchical node structure are not displayed.

* * * * *